Figure 1:
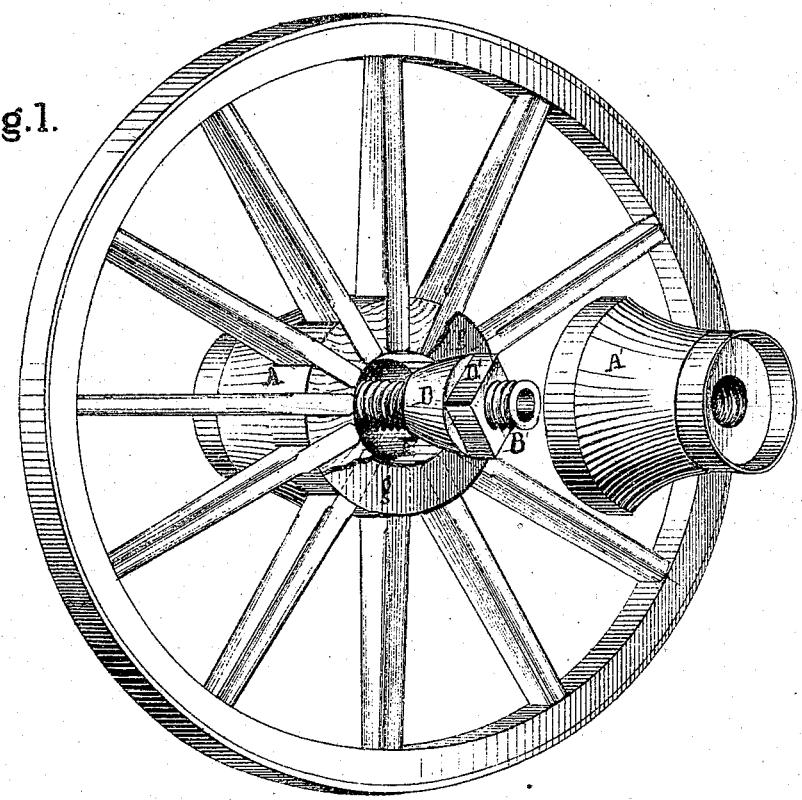

J. Y. Burwell.
Improvem! in Wagon & Carriage-Wheels.

No. 120,150.　　　　　　　　　　Patented Oct. 24, 1871.

Witnesses:
Fred. Artes
D. C. Colby

Inventor:
Joseph Y. Burwell
By D. C. Colby & Son
Attorneys

UNITED STATES PATENT OFFICE.

JOSEPH Y. BURWELL, OF WORTHINGTON, PENNSYLVANIA.

IMPROVEMENT IN HUBS FOR CARRIAGE-WHEELS.

Specification forming part of Letters Patent No. 120,150, dated October 24, 1871.

*To all whom it may concern:*

Be it known that I, JOSEPH Y. BURWELL, of Worthington, in the county of Armstrong and State of Pennsylvania, have, as I believe, invented new and useful Improvements in Expansible Hubs for Carriage-Wheels; and I do hereby declare the following to be a full and exact description of the same, reference being had to the drawing that accompanies and forms a part of this specification.

The object of my invention is to provide means for expanding the rim of the wheel so as to prevent the tire from loosening, and thus obviate the necessity of having it reset, and thus escaping all want of closeness in the parts, to secure greater durability in the wheel. My invention consists in providing upon the outer surface of the boxing of the wheel a strong screw-thread, and making an annular space between this and the hub and inner ends of the spokes, into which a tapering thimble enters, being screwed onto the thread of the pipe-box from the inner end of the hub until its outer surface presses closely against the inner ends of the spokes, all as hereinafter specified and set forth; and, further, in providing for tightening the spokes by bringing pressure to bear against their edges in the hub, which pressure can be made very forcible, in manner set forth in the specification which follows.

Figure 2:
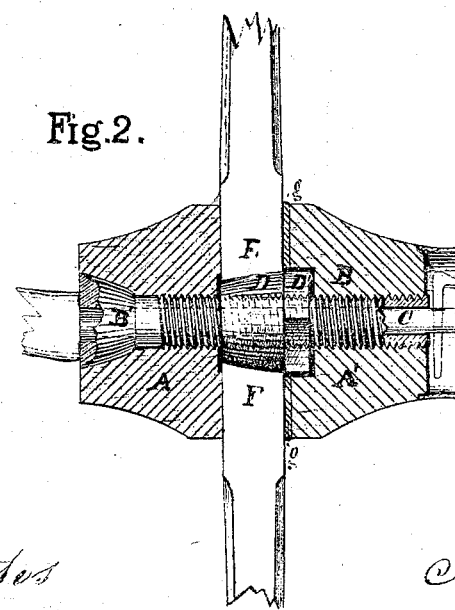

Figure 1 is a view of the wheel in perspective, a portion of the hub detached. Fig. 2 is a longitudinal section of the hub exhibiting the various parts within.

A, the hub of wagon or carriage-wheel; A', a detachable part of hub A: B, a pipe-box through the hub from end to end, with the inner end B' much enlarged, while most of the outer surface is covered with a strong screw-thread. (See Fig. 2.) C, spindle of the axle; D, a stout conical thimble, made to screw onto thread of pipe B, the outer end D' having the rectangular nut-form so that a wrench may be used to turn it; E, an open space around pipe B, which is filled by cone D when in position. (See Fig. 2.) F, the spokes, whose inner ends rest upon thimble D, as illustrated in the drawing. The detachable part A' of the hub is provided with screw-thread, adapting it to follow thimble D on the box B.

My invention embraces two distinct features: One, tightening the tire or band of the wheel by means of thimble D; and the other, tightening the spokes laterally by screwing up more closely the part A' of the hub. The starting of the spokes outwardly, though very slightly, makes it necessary to turn part A' close up.

On the enlarged part B' of box B one or two ribs should be formed so as to keep the said box B from turning when D or A' are turned.

A collar, $g$, is placed upon the box B, as in Fig. 2, before part A' is screwed on, and this collar or washer may be of material slightly yielding or elastic so as to give elasticity to the wheel and prevent the inner face of part A' from marring the spokes.

The drawing will illustrate the structure, arrangement, and operation of my device.

What I claim as my invention, and desire to secure by Letters Patent, is—

The above-described arrangement and combination of the thimble D provided with the rectangular-shaped end D' with the box B, and divided hub A and A', substantially as set forth.

In testimony whereof I have signed my name to this specification in the presence of two subscribing witnesses.

J. Y. BURWELL.

Witnesses:
 JOHN BECK,
 C. L. REYNOLDS. (31)